June 14, 1966  H. ELOFSON  3,256,026
READILY DETACHABLE STRAW BREAKER AND SCATTERER
Filed Oct. 28, 1963

INVENTOR.
HARRY ELOFSON
BY
Schroeder & Siegfried
ATTORNEY

3,256,026
READILY DETACHABLE STRAW BREAKER AND SCATTERER
Harry Elofson, 1200 Douglas Drive N., Minneapolis, Minn.
Filed Oct. 28, 1963, Ser. No. 319,408
5 Claims. (Cl. 275—3)

This invention relates to straw disintegrating devices. More particularly, it relates to attachments for combines for breaking up straw and either depositing the same in windrows behind the combine or spreading it uniformly over a wide area therebehind as desired.

In more recent years, the value of returning the straw to the land upon which grain is grown has been appreciated to a much greater extent. As a result, instead of collecting the straw and burning it as was previously the practice, it is considered more desirable to either break up the straw and spread it uniformly across the field as the grain is being combined or to deposit the straw in windrows behind the combine for subsequent baling and use as fodder or bedding. In the latter event, the soil is provided with a substitute for the straw to compensate for the loss. It is noteworthly, however, that conditions and desires vary in this respect and therefore, it is desired that combines be provided with an attachment which will permit the operator of the combine to either break up the straw and spread it uniformly or to deposit it in windrows for subsequent collection. It is also desirous, of course, that any changes required in the structure of the combine or attachment thereto may be quickly and easily accomplished with a minimum of labor, inconvenience, and loss of time. My invention is designed to fulfill these needs.

It is also desirable, of course, that any attachment for breaking the straw and spreading it be applicable with minimum power requirements. It is particularly desirable that the power requirements be such that no separate source of power be required and the device may be operated with a belt connection from one of the normally rotating shafts of the combine. This requires that the construction of the attachment have its elements optimumly arranged so as to diminish the power requirements to a bare minimum.

It is also important that the structure of such an attachment be such that there is little or no danger of plugging with consequent loss of valuable time and labor. It is important, therefore, that such a device be so constructed as to preclude such plugging and to effect a uniform and efficient distribution of the broken straw while at the same time maintaining the attendant dust, etc. at an absolute minimum. My invention is so constructed and arranged as to fulfill these requirements.

It is a general object of my invention to provide a novel and improved straw breaking device of simple and inexpensive construction and operation.

A more specific object is to provide a novel and improved straw braking device constructed and arranged in such a manner as to permit a ready changeover from a windrowing function to a straw breaking and scattering function with a minimum loss of time and effort.

Another object is to provide a novel and improved straw breaking device having inherent self-cleaning features and being constructed and arranged to require a minimum of power and a maximum of cutting action to more efficiently break the straw and distribute the same.

Another object is to provide a novel and improved straw breaking device portions of which are readily removable to transpose the combine from a windrowing device to an efficient straw breaking device and spreading device, the removable section being relatively simple in construction and operation and relatively inexpensive.

Another object is to provide a readily attachable and detachable panel for insertion within the discharge of a combine, the panel bearing resiliently mounted pivotable cooperating blade elements adapted to cooperate with a rotor mounted across the discharge of the combine to effectively break up the straw with minimum power requirements.

Another object is to provide a readily removable attachment for a combine having a rotor mounted across the discharge thereof the attachment being such as to cooperate with the rotor to provide efficient disintegration or breaking of the straw in a cooperative manner and to be adjustable to either distribute the straw over a wide area or to permit the same to fall directly behind the combine.

Another object is to provide a removable attachment for a combine having a plurality of resiliently mounted pivotable cooperating blades which when the attachment is connected to the combine will extend in optimum relation to the axis of rotation of a rotor mounted across the discharging portion of the combine whereby maximum efficiency in cutting action may be attained at minimum power requirements.

Another object is to provide disintegrating elements for a rotor mounted across the discharge portion of a combine which will more effectively cooperatively break the straw in cooperation with other blades and which will more efficiently operate at minimum power requirements as a result of an inherent self-cleaning feature provided by the construction and arrangement of the rotating elements on the rotor.

These and other objects and advantages of my invention will more fully appear from the following description, made in connection with the accompanying drawings, wherein like reference characters refer to the same or similar parts throughout the several views, and in which.

Figures 1, 2:
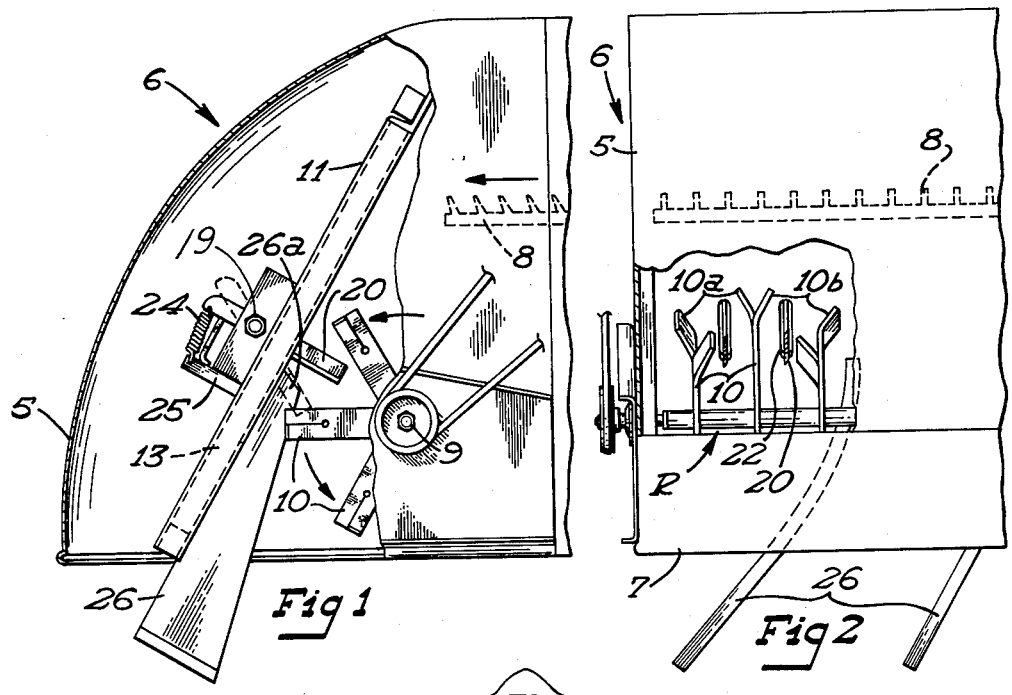
FIG. 1 is a side elevational view of the discharge portion of a combine with portions thereof broken away to better show the construction of the attachment the major portion of which is confined within the discharge of the combine.
FIG. 2 is a rear elevational view of the same with portions of the combine housing broken away to illustrate the relation between the breaker arms on the rotor and the resiliently mounted knives on the panel.
Figure 3:
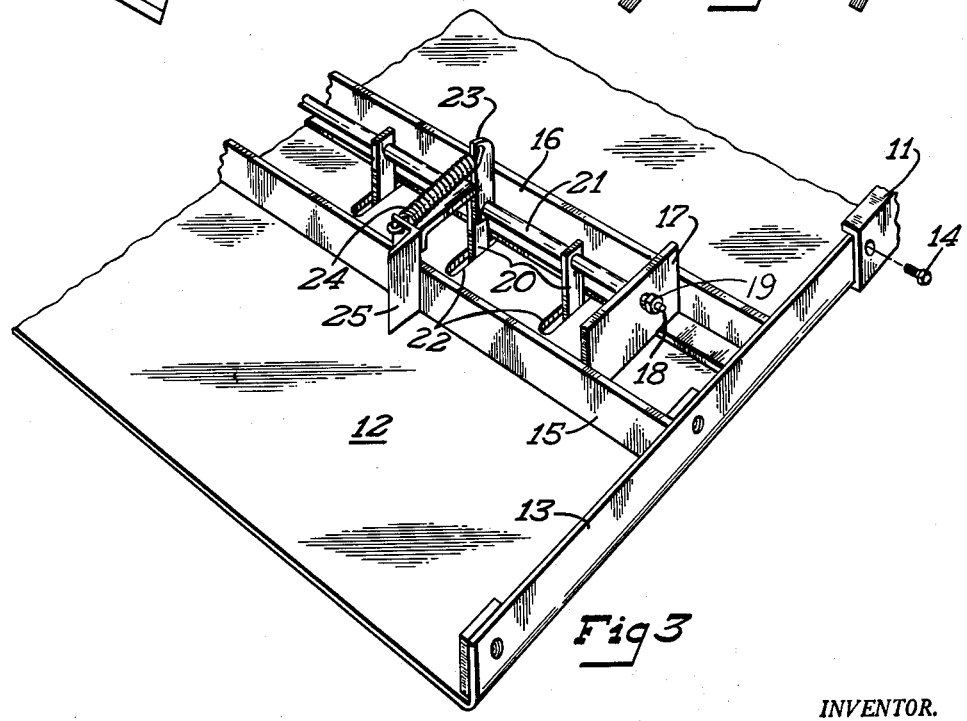
FIG. 3 is a fragmentary rear perspective view of the removable panel which constitutes a salient portion of my invention.

A preferred embodiment of my invention is shown in FIGS. 1–3 in association with the discharge housing 5 of a combine indicated generally by a numeral 6. The discharge housing 5 defines a discharge opening 7 and surrounds straw delivering mechanism 8 which delivers the straw in a direction indicated by the arrow immediately thereabove towards the rear of the combine housing which has a downwardly and rearwardly slope as best shown in FIG. 1. The housing 5 should have preferably at least a ten degree rearward slope in order that the broken straw will not blow forwardly and to the sides of the combine and foul the working portions thereof in a dry year when the straw is easily fractured.

Mounted on the housing 5 and extending transversely thereof across the discharge 7 and driven by a pulley at one end thereof by belt means connected to either the elevator shaft or jack shaft (not shown) of the combine as is conventional, is a rotor comprised of a shaft 9 carrying a plurality of axially spaced breaker arms 10 thereon. These breaker arms are also spaced from each other circumferentially and have their outer ends split into laterally and oppositely extending portions 10a and 10b as best shown in FIG. 2. It will be noted that the rotor indicated generally by the letter R is positioned at a lower elevation than the straw delivering means 8 so that normally the straw which is moved rearwardly by delivering means 8 will pass rearwardly of the rotor 9 and be deflected downwardly by the downwardly curved housing 5 and discharge through the opening 7 with a relatively small portion of the straw coming in contact with the rotor.

Secured to the inner surface of opposite sides of the housing 5 is a pair of upwardly and forwardly extending channel members 11. The channels of these channel members 11 face each other and are adapted to receive therein in sliding engagement a transversely extending panel 12 which has upwardly extending flanges 13 at each of its sides. The flanges 13 slide within the channels of the channel members 11 and are secured therewithin by bolts such as indicated by the numeral 14 at upper and lower ends of the channel members and of the flange members 13.

Extending transversely of the panel 12 in spaced relation is a pair of rearwardly extending bars 15 and 16 as best shown in FIG. 3. Extending between the bars 15 and 16 at opposite sides of the panel 12 and adjacent the flanges 13 is a pair of anchor plates such as the one indicated by the numeral 17. Each of the anchor plates 17 has an opening formed therein adapted to receive therethrough a pivot shaft 18 provided with a nut 19.

Carried by the pivot pin 18 are a plurality of cooperating disintegrator elements or blades 20 which are held in fixed relation to the pivot pin 18 by spacer sleeves 21 which are maintained under compression by tightening the nut 19. The actual compression applied to the spacer sleeves 21 maintains the blades 20 in fixed relation to the pivot pin 18 so that they pivot therewith. The blades 20, as best shown in FIG. 3, extend forwardly through elongated slots 22 which are formed in the panel member 12 to permit swinging movement of the blades from a radially extending position relative to the axis of rotation of the shaft 9 of the rotor R to an out of way position such as is illustrated by the broken line in FIG. 1.

Also carried upon the pivot pin 18 is a lever arm 23 which is held in fixed relation to the pivot pin 18 by the compression applied to the spacers 21 and this lever arm is constantly urged by a coil spring 24 in a direction such as to cause the blades 20 to extend with their cutting edges radially relative to the rotor R. The lower end of the spring 24 is anchored by an anchor post 25 which is secured to the bar 15.

Removably secured to the underside of the panel 12 is a plurality of downwardly and outwardly curved fins 26. There are preferably four of such fins in number, two of them extending outwardly and laterally to the left as shown in FIG. 2 and the other two extending outwardly and laterally to the right (not shown). These fin members are secured to the panel 12 by small bolts in such a manner that they may be readily removed from the panel 12 if and when desired. It will be noted that the breaker arms 10 pass between the upper and leading edges of the fins 26 immediately subsequent to completing the cooperative cutting action with the distintegrator blades 20. It will also be noted that the fins 26 have a leading edge 26a which extends downwardly and forwardly toward the axis of rotation of the rotor R.

It will also be noted that the cutting edge of the disintegrator blades 20 extends substantially radially relative to the axis of rotation of the rotor R. This provides a maximum scissor-like action between the blades and the breaker arms 10 which pass therebetween as best shown in FIG. 2. In the event a chunk of relatively wet straw is engaged by the arms 10 and the material is so tough that it cannot be cut by the cooperative action between the elements 10 and 20, then the elements 20 will swing to an out of the way position and permit the tough material to pass outwardly through the discharge opening 7 rather than plug the same. It will also be noted that the outwardly extending portions 10a and 10b at the ends of the breaker arms 10 effectively clean out the area between the adjacent pairs of disintegrator blades 20 as a result of the laterally extendiing portions of these arms. This self-cleaning feature is particularly effective in areas where morning-glories and other plants of the vine type are found heavily dispersed within the grain and in such quantities as to tend to entangle rotating parts with consequent loss of power and eventual plugging.

In operation the panel 12 is slid into the channel members 11 as illustrated in FIG. 3 and secured therewithin as illustrated in FIG. 1. The straw which is delivered rearwardly by the straw delivering means 8 is engaged by the upper portions of the panel member 12 which extends upwardly and forwardly to a position adjacent the upper edge of the housing 5 and is directed downwardly to be engaged by the breaker arms 10 of the rotor R. As the arms 10 rotate rearwardly in the direction indicated by the arrow the straw is engaged thereby and broken up by the cooperative action of the arms 10 and the blades 20. As best shown in FIG. 1 a very substantial scissor action is provided in this manner. The laterally extending portions 10a and 10b effectively clean the areas between the swingable blades 20 and are particularly effective in engaging straw which would otherwise extend longitudinally between the blades 20 and fail to move therethrough. The laterally extending portions 10a and 10b engage such straws and effectively break them and force them through the areas between the blades 20.

The breaker arms 10 also force the straw into the areas between the fins 26 in that the laterally extending portions 10a and 10b actually extend within the confines of the area between these fins. As a result, the straw is positively thrust into the areas between the fins and thrown downwardly and rearwardly therebetween from which the straw is directed laterally by the outwardly curved portions of the fins 26. If it is desired to merely break up the straw and deposit it upon the land immediately behind the combine (and this may be particularly desirable in times of strong wind) the fins 26 may be quickly and easily removed from the under surface of the panel 12.

In the event that it is desirous to windrow the straw and to provide a minimum of breaking action thereto the panel member 12 can be quickly and easily removed from the channel members 11 by removing the small bolts 14 and drawing the panel 12 downwardly and rearwardly to remove the same from the discharge opening 7. Thereafter the straw will pass over the rotor R and be discharged in windrows behind the combine as it moves across the field.

It will be noted that the radially extending cutting edge of the blades 20 provides a cooperative action with the breaker arms 10 which prevents the straw from sliding forwardly off the forward end of the blades 20. This action forces the straw into the spreader fins 26 which gives the optimum spreading function. If these knives are positioned at a lower elevation the straw tends to slip off the ends of the blades 20 and is not spread as effectively because it will be thrown forwardly and downwardly by the arms 10 to a position ahead of the spreading fins. If the blades 20 are positioned at a more elevated position such that the cutting edge does not extend substantially radially of the rotor, then the effectiveness of the scissor action is diminished because such action will be provided for only the outer more portions of the breaker arms 10.

It will be noted that the cooperating blades 20 are positioned at a point where that housing 5 extends substantially tangential to the orbit of the rotor R. It is desirable that the blades 20 be positioned no lower than this point because from that point on the straw will be pulled away from the housing with the result that the spreader fins 26 will be less effective. If the blades 20 are positioned above or ahead of the point where the orbit of the rotor is tangential to the deflecting housing 5, a plugging tendency results because the breaker arms 10 do not pass the innermore portions of the cutting edges of the blades 20 and the straw will not hit these blades with sufficient force because the breaker arms 10 will not yet have had an opportunity to engage the stalks of straw as positively as at the lower more position.

It will be noted that the rotor is disposed at a lower elevation than the walker or conveyor means 8 for the straw. It is better if this relationship is maintained because if the rotor is disposed at the same elevation the upswinging arms tend to engage the stalks of the straw and throw the same upwardly against the housing 5 from whence the straw again descends and is reengaged by the arms, this action being repeated again and again until sufficient mass occurs to cause the same to be engaged and carried around by the breaker arms. This action is particularly noticeable when the straw is wet and tough and results in substantially higher power requirements than with the construction shown.

From the above it can be seen that I have provided a novel and improved attachment for combines for effectively breaking and spreading the straw which passes therethrough, the attachment being simple, inexpensive and readily removable to provide optimum and maximum operating efficiency under a variety of conditions which may be encountered by the combine operator.

It will, of course, be understood that various changes may be made in the form, details, arrangement and proportions of the parts without departing from the scope of my invention which consists of the matter shown and described herein and set forth in the appended claims.

What is claimed is:

1. A straw breaking device comprising in combination: a grain combine having a downwardly directed discharge chute, a rotor mounted across the discharge of said combine, an upwardly and forwardly extending panel member, means removably mounting said panel member within said discharge chute of said combine adjacent to and rearwardly of said rotor in position to receive straw thereagainst from the combine and to direct the straw to said rotor, a plurality of breaker elements carried by said rotor and rotating therewith, a plurality of cooperating disintegrator elements carried by said panel member and extending inwardly of the orbit of said breaker elements and cooperating therewith to break up the straw, and downwardly extending diverging spreader elements mounted on said panel member immediately adjacent and below said disintegrator elements and receiving straw therefrom and spreading the same.

2. A straw breaking device comprising in combination: a grain combine having a downwardly directed discharge chute, a rotor mounted across the discharge of said combine, an upwardly and forwardly extending panel member, means removably mounting said panel member within said discharge chute of said combine adjacent to and rearwardly of said rotor in position to receive straw thereagainst from the combine and to direct the straw to said rotor a plurality of breaker elements carried by said rotor and rotating therewith, a plurality of cooperating disintegrator elements carried by said panel member and extending inwardly of the orbit of said breaker elements and cooperating therewith to break up the straw, the cooperating disintegrator elements being mounted on a surface of the panel member remote from the rotor and extending through apertures in the panel member to permit the disintegrator elements to swing from a generally radially extending position relative to the rotor to an out of the way position relative to the breaker elements carried by the rotor, resilient means connected between the cooperating disintegrator elements and the panel to urge the disintegrator elements against movement toward the out of the way position, and downwardly extending diverging spreader elements mounted on said panel member immediately adjacent and below said disintegrator elements and receiving straw therefrom and spreading the same.

3. A straw breaking device comprising in combination: a grain combine having a downwardly directed discharge chute, a rotor mounted across the discharge of said combine, an upwardly and forwardly extending panel member, means removably mounting said panel member within said discharge chute of said combine adjacent to and rearwardly of said rotor in position to receive straw thereagainst from the combine and to direct the straw to said rotor, a plurality of breaker elements carried by said rotor and rotating therewith, a plurality of cooperating disintegrator elements carried by said panel member and extending inwardly of the orbit of said breaker elements and cooperating therewith to break up the straw, and downwardly extending diverging spreader elements mounted on the undersurface of the panel member immediately adjacent and below said disintegrator elements, said spreader elements having edge portions extending within the orbits and between said breaker elements mounted on the rotor with said edge portions sloping inwardly toward the axis of rotation of said rotor.

4. A straw breaking device comprising in combination: a grain combine having a downwardly directed discharge chute, a rotor mounted across the discharge of said combine, an upwardly and forwardly extending panel member, means removably mounting said panel member within said discharge chute of said combine adjacent to and rearwardly of said rotor in position to receive straw thereagainst from the combine and to direct the straw to said rotor, a plurality of breaker elements carried by said rotor and rotating therewith, a plurality of cooperating disintegrator elements carried by said panel member and extending inwardly of the orbit of said breaker elements and cooperating therewith to break up the straw, and channel members carried by opposite sides of said discharge chute, said channel members extending upwardly and forwardly within said chute rearwardly of said rotor and slidably receiving opposed lateral portions of said panel member therein whereby said panel member may be readily removed from said chute as desired to permit the straw to be discharged therefrom without being broken.

5. A straw breaking device comprising in combination: a grain combine having a downwardly directed discharge chute, a rotor mounted across the discharge of said combine, an upwardly and forwardly extending panel member, means removably mounting said panel member within said discharge chute of said combine adjacent to and rearwardly of said rotor in position to receive straw thereagainst from the combine and to direct the straw to said rotor, a plurality of breaker elements carried by said rotor and rotating therewith, a plurality of cooperating disintegrator elements carried by said panel member and extending inwardly of the orbit of said breaker elements and cooperating therewith to break up the straw, the cooperating disintegrator elements being mounted on a surface of the panel member remote from the rotor and extending through apertures in the panel member to permit the disintegrator elements to swing from a generally radially extending position relative to the rotor to an out of the way position relative to the breaker elements carried by the rotor, resilient means connected between the cooperating disintegrator elements and the panel to urge the disintegrator elements against movement toward the out of the way position, downwardly extending diverging spreader elements mounted on said panel member immediately adjacent and below said disintegrator elements and receiving straw therefrom and spreading the same, and channel members carried by opposite sides of said discharge chute, said channel members extending upwardly and forwardly within said chute rearwardly of said rotor and slidably receiving opposed lateral portions of said panel member therein whereby said panel member may be readily removed from said chute as desired to permit the straw to be discharged therefrom without being broken.

References Cited by the Examiner
UNITED STATES PATENTS

| | | | |
|---|---|---|---|
| 2,502,032 | 3/1950 | Watson | 275—3 |
| 2,626,159 | 1/1953 | Thompson | 275—3 |
| 2,810,583 | 10/1957 | Elofson | 275—3 |
| 3,005,637 | 10/1961 | Hetteen | 275—3 |
| 3,018,718 | 1/1962 | Wenzel | 146—117 X |
| 3,165,133 | 1/1965 | Karlsson et al. | 146—117 |

ABRAHAM G. STONE, *Primary Examiner.*

WILLIAM A. SMITH III, *Assistant Examiner.*